(12) United States Patent
Nagai et al.

(10) Patent No.: US 11,019,415 B2
(45) Date of Patent: May 25, 2021

(54) COVER MEMBER FOR IN-VEHICLE SPEAKER, VEHICLE, IN-VEHICLE SPEAKER DEVICE, AND COVER STRUCTURE FOR IN-VEHICLE SPEAKER

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Yasuyuki Nagai, Kariya (JP); Hiroki Takada, Kariya (JP); Atsushi Yamaguchi, Kariya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/363,270

(22) Filed: Mar. 25, 2019

(65) Prior Publication Data
US 2019/0306599 A1    Oct. 3, 2019

(30) Foreign Application Priority Data
Mar. 28, 2018   (JP) .............................. JP2018-062740

(51) Int. Cl.
*H04R 1/02*       (2006.01)
*B60R 11/02*    (2006.01)

(52) U.S. Cl.
CPC .......... *H04R 1/023* (2013.01); *B60R 11/0217* (2013.01); *H04R 1/025* (2013.01); *H04R 2499/13* (2013.01)

(58) Field of Classification Search
CPC .... H04R 1/023; H04R 1/025; H04R 2499/13; B60R 11/0217
USPC .......................................... 381/86, 302, 365
See application file for complete search history.

(56) References Cited

U.S. PATENT DOCUMENTS

| 5,623,133 | A | 4/1997 | Kurihara | |
|---|---|---|---|---|
| 5,690,886 | A | 11/1997 | Kurihara | |
| 7,120,322 | B2 * | 10/2006 | Furuya | B82Y 20/00 385/8 |
| 8,720,966 | B2 * | 5/2014 | Stein | B60R 13/02 296/1.08 |
| 9,466,194 | B1 * | 10/2016 | Kraz | G08B 21/14 |
| 2007/0177754 | A1 * | 8/2007 | Kemmerer | H04R 1/023 381/391 |

(Continued)

FOREIGN PATENT DOCUMENTS

| CN | 102857854 A | 1/2013 |
|---|---|---|
| JP | 7-288886 A | 10/1995 |

*Primary Examiner* — Disler Paul
(74) *Attorney, Agent, or Firm* — Sughrue Mion, PLLC

(57) ABSTRACT

A front left speaker cover for a front left speaker includes a first hole forming portion in which holes each having a bottom are formed. The first hole forming portion is a section including a first edge of the front left speaker cover. The holes include a first hole and a second hole. The first hole is formed in the first edge of the front left speaker cover and opens in a surface direction of the front left speaker cover. The second hole is formed in a section different from the first edge and a fourth edge. The distance from the surface of the front left speaker cover to the bottom of the first hole is shorter than the distance from the surface of the front left speaker cover to the bottom of the second hole.

16 Claims, 4 Drawing Sheets

(56) References Cited

U.S. PATENT DOCUMENTS

| | | | |
|---|---|---|---|
| 2013/0001971 A1 | 1/2013 | Stein | |
| 2014/0294195 A1* | 10/2014 | Perez | H04R 5/02 |
| | | | 381/86 |
| 2016/0334379 A1* | 11/2016 | Mittleman | G01N 33/0036 |
| 2018/0176670 A1* | 6/2018 | Nakatsukasa | H04R 1/023 |
| 2019/0222924 A1* | 7/2019 | Groleau | B60N 2/879 |

* cited by examiner

US 11,019,415 B2

COVER MEMBER FOR IN-VEHICLE SPEAKER, VEHICLE, IN-VEHICLE SPEAKER DEVICE, AND COVER STRUCTURE FOR IN-VEHICLE SPEAKER

BACKGROUND

1. Field

The present invention relates to a cover member for an in-vehicle speaker, a vehicle, an in-vehicle speaker device, and a cover structure for an in-vehicle speaker.

2. Description of Related Art

Conventionally, an audio speaker is mounted in a vehicle to improve comfort in the passenger compartment or generate alert messages for the driver. Japanese Laid-Open Patent Publication No. 7-288886 discloses a configuration in which an in-vehicle speaker is protected by a speaker grille. The speaker grille includes, as described in the document, a grille plate and a frame body. The grille plate has multiple punch holes. The frame body is integrated with the periphery of the grille plate. A ring-shaped groove is disposed between the grille plate and the frame body. The groove regulates the flow of plastic in the mold.

In the speaker grille disclosed in the aforementioned document, however, multiple punch holes are also formed in the edge section of the grille plate and open in a surface direction. The punch holes form visible dents in the edge section of the grille plate, thus deteriorating the aesthetic appearance of the speaker grille.

SUMMARY

Accordingly, it is an objective of the present invention to provide a cover member for an in-vehicle speaker, a vehicle, an in-vehicle speaker device, and a cover structure for an in-vehicle speaker that prevent deterioration of the aesthetic appearances.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a cover member for an in-vehicle speaker is provided that includes a hole forming portion in which a plurality of holes each having a bottom is formed. The hole forming portion is a section including an edge section of the cover member. The holes include a first hole that is formed in the edge section of the cover member and opens in a surface direction of the cover member, and a second hole that is formed in a section of the cover member different from the edge section. A distance from a surface of the cover member to a bottom of the first hole is shorter than the distance from the surface of the cover member to a bottom of the second hole.

In another general aspect, a vehicle is provided that includes an instrument panel provided in front of a driver's seat, an in-vehicle speaker provided on a backside of the instrument panel, and a cover member for the in-vehicle speaker. The cover member includes a hole forming portion in which a plurality of holes each having a bottom is formed. The hole forming portion is a section including an edge of the cover member. The holes include a first hole that is formed in the edge of the cover member and opens in a surface direction of the cover member, and a second hole that is formed in a section of the cover member different from the edge. A distance from a surface of the cover member to a bottom of the first hole is shorter than the distance from the surface of the cover member to a bottom of the second hole. The first hole is formed in an edge of the cover member that faces in a direction away from a center of a passenger compartment.

In another general aspect, an in-vehicle speaker device is provided that includes an in-vehicle speaker and a cover member for the in-vehicle speaker. The cover member includes a hole forming portion in which a plurality of holes each having a bottom is formed. The hole forming portion is a section including an edge of the cover member. The holes include a first hole that is formed in the edge of the cover member and opens in a surface direction of the cover member, and a second hole that is formed in a section of the cover member different from the edge. A distance from a surface of the cover member to a bottom of the first hole is shorter than the distance from the surface of the cover member to a bottom of the second hole.

In another general aspect, a cover structure for an in-vehicle speaker is provided that includes a cover member for covering the in-vehicle speaker. The cover member includes a hole forming portion in which a plurality of holes each having a bottom is formed. The hole forming portion is a section including an edge of the cover member. The holes include a first hole that is formed in the edge of the cover member and opens in a surface direction of the cover member, and a second hole that is formed in a section of the cover member different from the edge. A distance from a surface of the cover member to a bottom of the first hole is shorter than the distance from the surface of the cover member to a bottom of the second hole.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A vehicle 10 according to an embodiment will now be described. The front-rear direction and the left-right direction herein refer to the front-rear direction and the left-right direction, respectively, in the vehicle 10.

Figure 1:
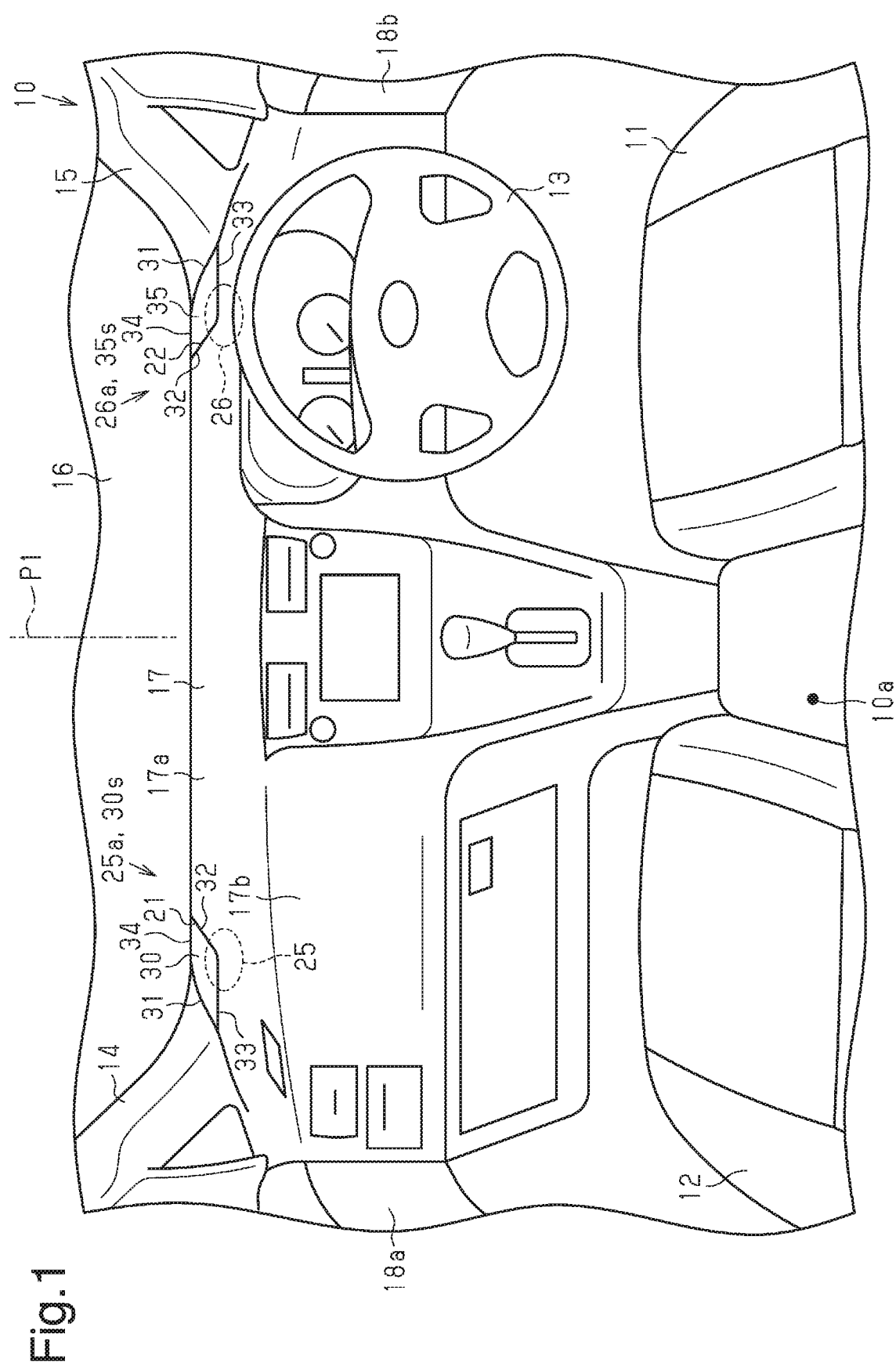
FIG. 1 is a schematic diagram illustrating the interior of a vehicle.

As shown in FIG. 1, the vehicle 10 includes a driver's seat 11, a front passenger seat 12, and a steering wheel 13 in a passenger compartment 10a. The steering wheel 13 is supported in front of the driver's seat 11. The driver's seat 11 and the front passenger seat 12 are arranged on the left side and the right side, respectively. The positions of the driver's seat 11 and the front passenger seat 12 may be switched. The front passenger seat 12 may be omitted.

The vehicle 10 includes a front left pillar 14, a front right pillar 15, and a windshield panel 16. The windshield panel 16 is supported between the front left pillar 14 and the front right pillar 15. The windshield panel 16 is a glass panel. The vehicle 10 includes a front left door 18a and a front right door 18b. The front left door 18a is supported in an openable-closable manner on the rear side to the front left pillar 14. The front right door 18b is supported in an openable-closable manner on the rear side to the front right pillar 15. The vehicle 10 has an instrument panel 17. The instrument panel 17 is supported in front of the driver's seat 11 and the front passenger seat 12 and extends in the left-right direction between the front left pillar 14 and the front right pillar 15.

The instrument panel 17 has a panel top surface 17a extending along a horizontal plane. The panel top surface 17a may extend in a manner crossing the horizontal plane or parallel to the horizontal plane. The panel top surface 17a may be curved either partially or entirely. Also, dents or protrusions may be formed in either a section of the panel top surface 17a or the entire panel top surface 17a. The instrument panel 17 has a panel front surface 17b. The panel front surface 17b extends downward from the edge section of the panel top surface 17a that faces the driver's seat 11.

The instrument panel 17 has a left attachment portion 21. The left attachment portion 21 allows the compartment-facing side and the backside of the instrument panel 17 to communicate with each other. The left attachment portion 21 is arranged in the front left end of the panel top surface 17a and is adjacent to the front left pillar 14 and the windshield panel 16. The instrument panel 17 has a right attachment portion 22. The right attachment portion 22 allows the compartment-facing side and the backside of the instrument panel 17 to communicate with each other. The right attachment portion 22 is arranged in the front right end of the panel top surface 17a and is adjacent to the front right pillar 15 and the windshield panel 16.

The vehicle 10 includes a front left speaker 25 and a front right speaker 26. The front left speaker 25 is disposed at a position corresponding to the left attachment portion 21. The front right speaker 26 is arranged at a position corresponding to the right attachment portion 22. As viewed from the driver's seat 11 and the front passenger seat 12, the front left speaker 25 and the front right speaker 26 are both disposed on the backside of the instrument panel 17 and arranged below the panel top surface 17a. The front left speaker 25 and the front right speaker 26 may each be a cone-shaped, dome-shaped, or flat-shaped speaker. The front left speaker 25 and the front right speaker 26 each correspond to an in-vehicle speaker. The vehicle 10 may also include an additional speaker (additional speakers) other than the front left speaker 25 and the front right speaker 26.

The vehicle 10 includes a front left speaker cover 30 and a front right speaker cover 35. The front left speaker cover 30 covers the left attachment portion 21, and the front right speaker cover 35 covers the right attachment portion 22. The front left speaker cover 30 and the front right speaker cover 35 each correspond to a cover member for an in-vehicle speaker. The front left speaker 25 and the front left speaker cover 30 configure a left speaker device 25a. The front right speaker 26 and the front right speaker cover 35 configure a right speaker device 26a. A hypothetical plane P1 extends perpendicularly to the direction in which the driver's seat 11 and the front passenger seat 12 are arranged. The front left speaker cover 30 and the front right speaker cover 35 are configured symmetrically with respect to the hypothetical plane P1. Therefore, the detailed description below is focused on a cover structure 30s of the front left speaker cover 30, with the description of a cover structure 35s of the front right speaker cover 35 omitted or simplified.

Figure 2:
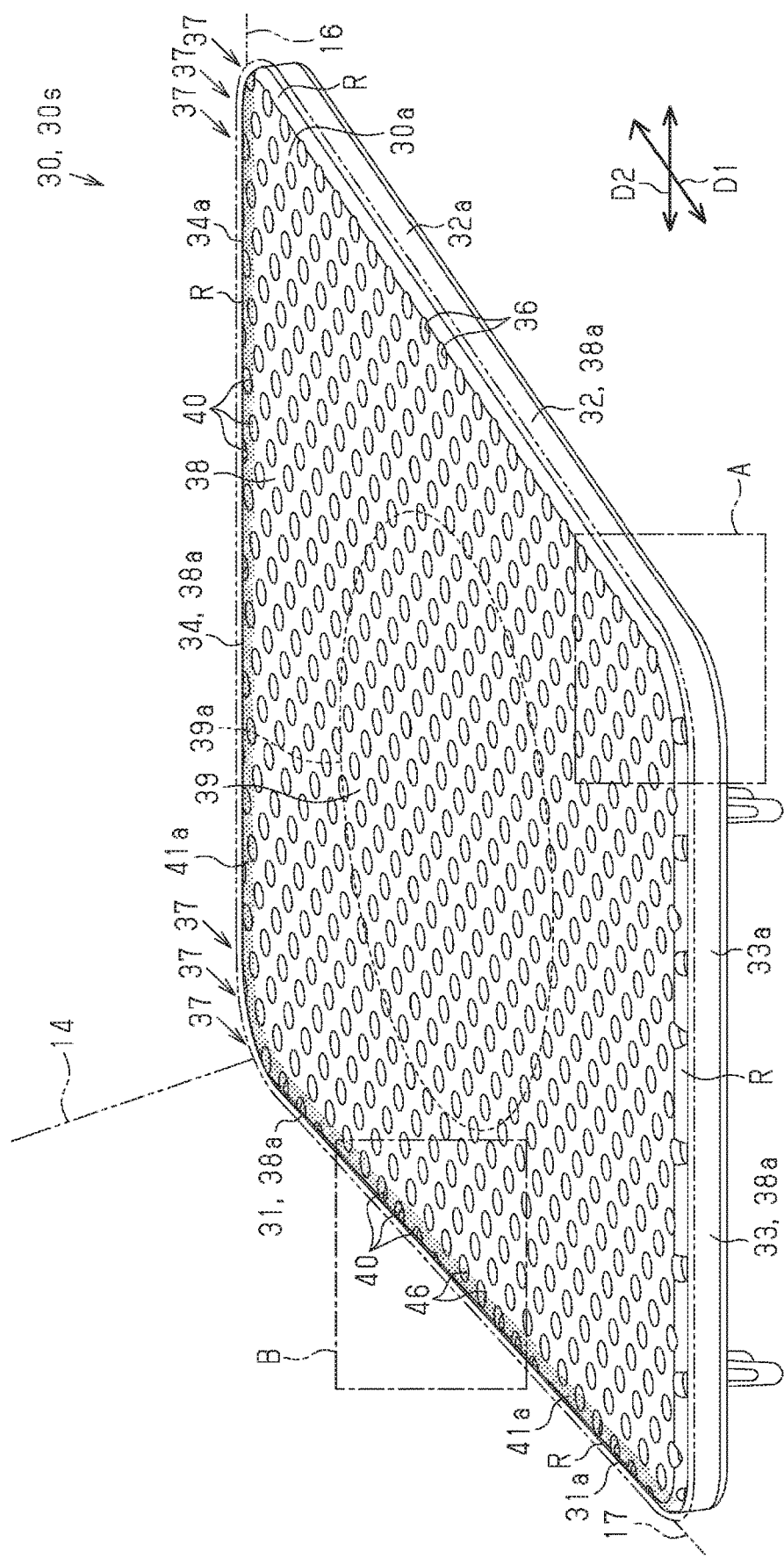
FIG. 2 is a perspective view showing a front left speaker cover.

With reference to FIG. 2, the front left speaker cover 30, as a whole, is shaped like a rectangular plate. The front left speaker cover 30 has a surface 30a surrounded by four edge sections. The front left speaker cover 30 has a first edge section 31, a second edge section 32, a third edge section 33, and a fourth edge section 34. The edge sections 31 to 34 configure the outer peripheral section of the front left speaker cover 30. The "surface direction" herein refers to a direction along the surface 30a and, more preferably, a direction perpendicular to the normal line to the surface 30a.

The first edge section 31 includes a first edge 31a. The first edge 31a faces outward (leftward) in the surface direction of the front left speaker cover 30. The second edge section 32 includes a second edge 32a. The second edge 32a faces outward (rightward) in the surface direction of the front left speaker cover 30. The third edge section 33 includes a third edge 33a. The third edge 33a faces outward (rearward) in the surface direction of the front left speaker cover 30. The fourth edge section 34 includes a fourth edge 34a. The fourth edge 34a faces outward (forward) in the surface direction of the front left speaker cover 30.

Each "edge section" herein refers to a range that includes the corresponding "edge" of the front left speaker cover 30 and has a certain width (a certain surface area) from the "edge", as viewed perpendicularly to the surface direction of the surface 30a. The "edge section" and the "edge" have different definitions herein. Each of the edges 31a to 34a is an end surface having a planar shape. The edges 31a to 34a each may have either an arcuate shape bulging outward in the surface direction or a projecting shape at an acute angle.

The extending direction of the first edge section 31 coincides with the extending direction of the first edge 31a. The extending direction of the second edge section 32 coincides with the extending direction of the second edge 32a. The extending direction of the third edge section 33 coincides with the extending direction of the third edge 33a. The extending direction of the fourth edge section 34 coincides with the extending direction of the fourth edge 34a. As viewed perpendicularly to the surface 30a, each of the sections at which corresponding adjacent two of the edge sections 31 to 34 are continuous with each other has an arcuate shape. Each of the sections of the front left speaker cover 30 at which the edges 31a to 34a are continuous with the surface 30a is, as a whole, an arcuate surface R.

The edge sections 31 to 34 in a state in which the front left speaker cover 30 is joined to the instrument panel 17 will hereafter be described in detail. The first edge section 31 extends in the front-rear direction in the left end of the front left speaker cover 30. The first edge section 31 is adjacent to the front left pillar 14. The second edge section 32 extends in the front-rear direction in the right end of the front left speaker cover 30. That is, the second edge section 32 is arranged opposite to the first edge section 31. The third edge section 33 extends in the left-right direction in the front end of the front left speaker cover 30. The fourth edge section 34 extends in the left-right direction in the rear end of the front left speaker cover 30.

As has been described, the first edge section 31 is an edge section facing in a direction away from the center of the passenger compartment 10a in the front-rear direction and the center of the passenger compartment 10a in the left-right direction. The fourth edge section 34 is an edge section facing in a direction away from the center of the passenger compartment 10a. The rear end of the first edge section 31 and the rear end of the second edge section 32 are continuous with the third edge section 33. The front end of the first edge section 31 and the front end of the second edge section 32 are continuous with the fourth edge section 34.

The extending direction of the third edge section 33 and the extending direction of the fourth edge section 34 are parallel or substantially parallel to each other. The extending direction of the first edge section 31 and the extending direction of the second edge section 32 are non-parallel to each other and cross each other. That is, at least one of the angles at the four intersection points of the edge sections 31 to 34 is unequal to 90 degrees.

The front left speaker cover 30 has multiple holes 36. The holes 36 are arranged in the entire surface 30a. The holes 36 are arranged in a predetermined arrangement pattern from the second edge section 32 to the first edge section 31. The holes 36 include those that are bottomless and extend through the front left speaker cover 30 in the thickness direction. The rest of the holes 36 have bottoms and are formed without extending through the front left speaker cover 30.

An example of the arrangement pattern will hereafter be described.

The arrangement pattern of the present embodiment includes multiple hole rows 37, each of which has multiple holes 36 arranged at uniform intervals in the first direction D1. The hole rows 37 are spaced apart at uniform intervals in the second direction D2 perpendicular to the first direction D1. Also, in the arrangement pattern, each of the holes 36 configuring any hole row 37 is disposed between two of the holes 36 configuring an adjacent hole rows 37 in the second direction D2.

The arrangement pattern is employed in the front left speaker cover 30 with the first direction D1 coinciding with the extending direction of the second edge section 32 and the second direction D2 coinciding with the direction perpendicular to the extending direction of the second edge section 32. In the arrangement pattern, the holes 36 do not open in the surface direction in the second edge section 32, and the hole rows 37 each extend along the second edge section 32 (the second edge 32a). Specifically, when a hole 36 "opens in the surface direction" as described herein, the corresponding edge section (the corresponding edge) of the speaker cover overlaps with the hole 36 such that the hole 36 is incompletely surrounded by the corresponding section of the speaker cover. In this state, as the edge section (the edge) of the speaker cover is viewed in the surface direction, the interior of the hole 36 is visible and exposed.

One of the hole rows 37 that is closest to the second edge 32a overlaps with the arcuate surface R in the second edge section 32. As has been described, the holes 36 are arranged in a line along the second edge 32a and arranged in the uniform arrangement pattern from the second edge 32a to the first edge 31a. Specifically, the hole row 37 closest to the second edge 32a does not necessarily have to overlap with the arcuate surface R in the second edge section 32. In the present embodiment, the holes 36 configuring the hole row 37 closest to the second edge 32a do not open in the surface direction of the surface 30a in the second edge section 32. These holes 36, however, may open in the surface direction in the second edge section 32.

Figure 3:
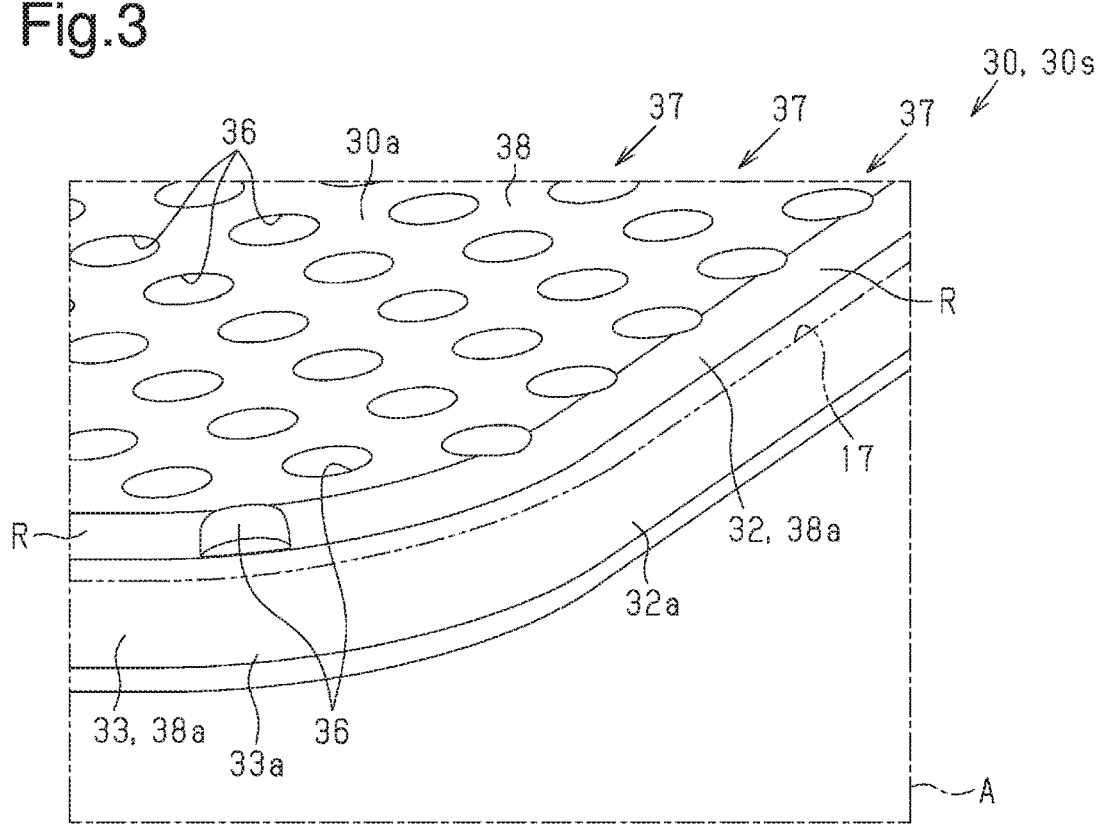
FIG. 3 is an enlarged perspective view showing section A in FIG. 2.

Most of the holes 36 have circular shapes as viewed perpendicularly to the surface 30a. However, some of the holes 36 overlap with the first edge section 31, the third edge section 33, or the fourth edge section 34 and thus have incomplete and non-circular walls. That is, as illustrated in FIGS. 2 and 3, those of the holes 36 arranged along the second edge section 32 all have complete circular shapes. In contrast, those of the holes 36 in the third edge section 33 or the fourth edge section 34 include at least some holes 36 overlapping with the third edge 33a or the fourth edge 34a and thus having incomplete circular shapes.

Figure 4:
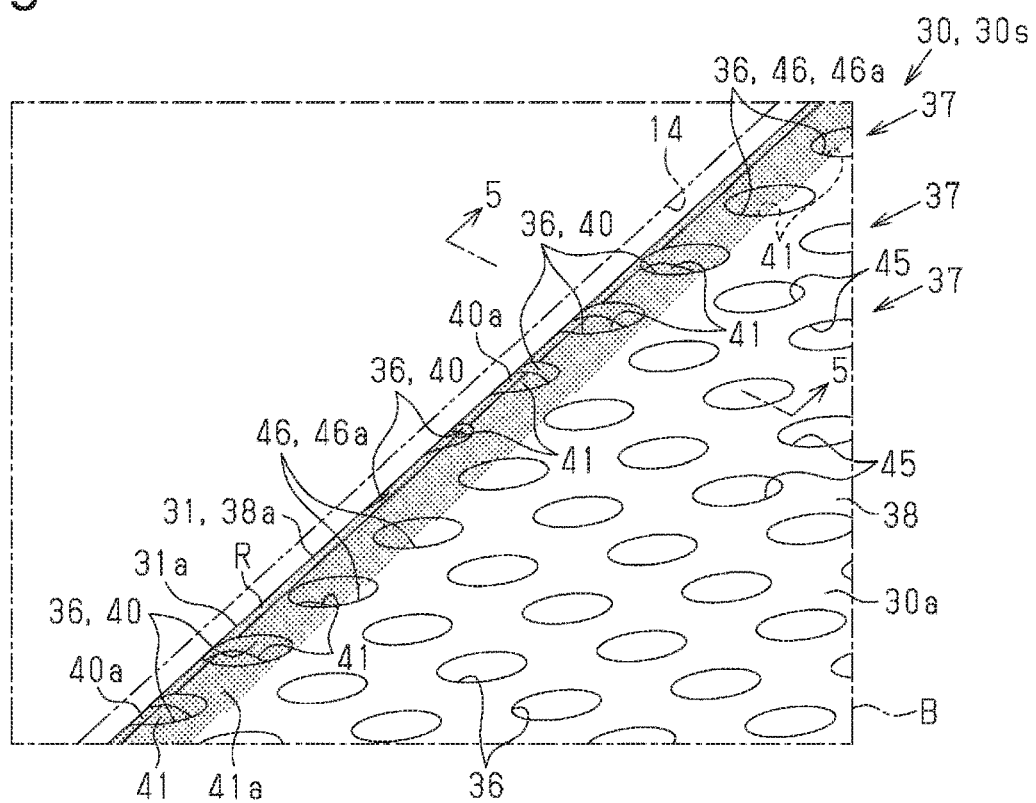
FIG. 4 is an enlarged perspective view showing section B in FIG. 2.

As shown in FIGS. 2 and 4, in the first edge section 31, the extending direction of the first edge section 31 (the first edge 31a) does not coincide with the extending directions of the corresponding hole rows 37. As a result, a greater number of holes 36 overlap with the first edge 31a. That is, a comparatively high proportion of the holes 36 in the first edge section 31 are non-circular. The front left speaker cover 30 has a first hole forming portion 38 and a second hole forming portion 39. In the range in which the holes 36 are formed in the surface 30a, the first hole forming portion 38 is outside the range surrounded by the broken line and the second hole forming portion 39 is the range surrounded by the broken line.

The second hole forming portion 39 is a center or substantially center section of the surface 30a. The first hole forming portion 38 is the sections of the surface 30a except the second hole forming portion 39, that is, the range including the edge sections 31 to 34. A peripheral edge section 39a of the second hole forming portion 39 is entirely adjacent to the first hole forming portion 38. The first hole forming portion 38 has four edge sections 38a. The edge sections 38a are the same as the corresponding edge sections 31 to 34 of the front left speaker cover 30. That is, the edge sections 38a of the first hole forming portion 38 are the edge sections of the first hole forming portion 38 that overlap with the outer peripheral section of the front left speaker cover 30. In other words, the first hole forming portion 38 is a portion that includes the edge sections 31 to 34 (the edges 31a to 34a) of the front left speaker cover 30.

The first hole forming portion 38 has some of the holes 36. The holes 36 in the first hole forming portion 38 each have a bottom. The holes 36 in the first hole forming portion 38 are formed without extending through the front left speaker cover 30 in the thickness direction. The second hole forming portion 39 also has some of the holes 36. The holes 36 in the second hole forming portion 39 extend through the front left speaker cover 30 in the thickness direction. The holes 36 in the second hole forming portion 39 are bottomless and allow the compartment-facing side and the backside of the front left speaker cover 30 to communicate with each other. The holes 36 in the second hole forming portion 39 are sound releasing holes for transmitting sound from the front left speaker 25 to the exterior.

The front left speaker cover 30 may include a covering member for covering the surface 30a or the back surface of the front left speaker cover 30. It is desirable that the covering member be a material that is unlikely to obstruct sound transmission from the front left speaker 25, such as non-woven fabric or a sheet-shaped sponge.

Hereinafter, those of the holes 36 formed in the first edge section 31 or the fourth edge section 34 and opening in the surface direction of the front left speaker cover 30 will be referred to as first holes 40. Those of the holes 36 formed in the first edge section 31 or the fourth edge section 34 without opening in the surface direction of the front left speaker cover 30 will be referred to as third holes 46.

When "a hole 36 is formed in a certain edge section" as described herein, the hole 36 and the certain edge section are arranged in the manner described below. That is, when the edge included in the certain edge section is defined as the certain edge, the hole 36 is located at either a position overlapping with the certain edge or a position that does not overlap with the certain edge but closest to the certain edge in a surface direction of the front left speaker cover 30 perpendicular to the extending direction of the certain edge. When the hole 36 is located at "the position closest to the certain edge," the hole 36 is the closest to the certain edge among the holes 36 arranged in the direction perpendicular to the extending direction of the certain edge.

Those of the holes 36 formed in a section farther from the first edge 31a and the fourth edge 34a than the first holes 40 and the third holes 46 will be referred to as second holes 45. As has been described, the holes 36 in the first hole forming portion 38 include the first holes 40, the second holes 45, and the third holes 46.

Figure 5:
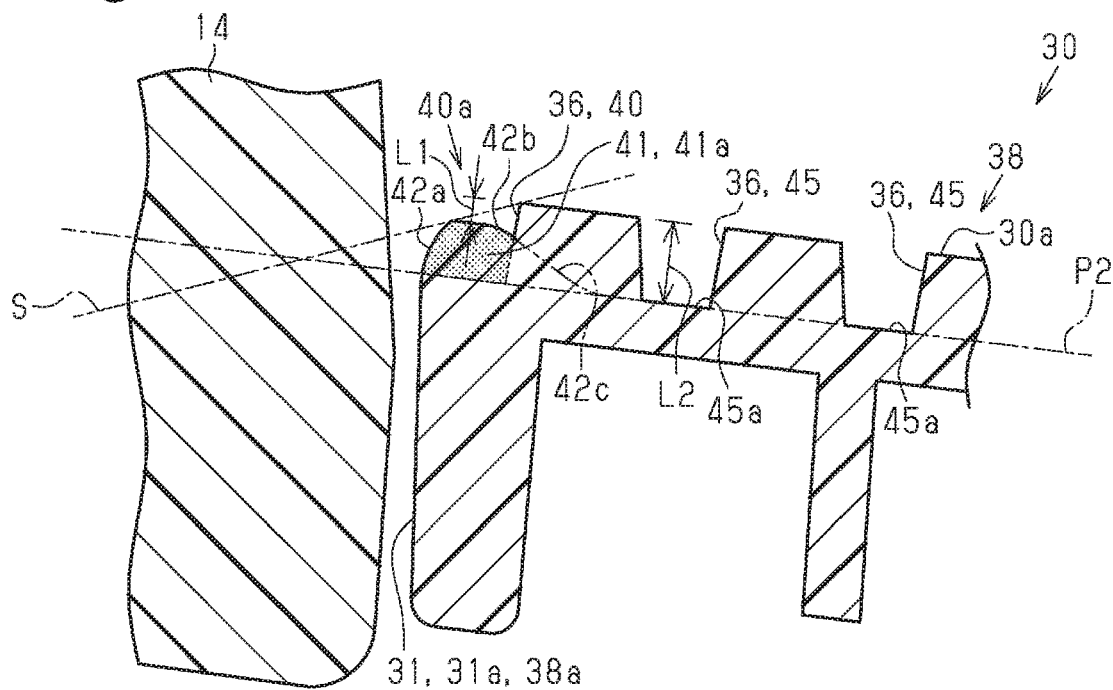
FIG. 5 is a cross-sectional view taken along line 5-5 in FIG. 4.

As illustrated in FIGS. 4 and 5, the front left speaker cover 30 includes projections 41 projecting in the direction perpendicular to the surface 30a. Each of the projections 41 is formed on a bottom 40a of the associated one of the first holes 40, which are formed in the first edge section 31 and the fourth edge section 34. That is, each first hole 40 opens in the surface direction of the front left speaker cover 30 and includes the corresponding projection 41. Similarly, the front left speaker cover 30 includes other projections 41. Each of the projections 41 is formed on a bottom 46a of the associated one of the third holes 46. The second holes 45 each has a bottom 45a without a projection 41. The bottoms 45a of the second holes 45 are all flat surfaces.

Hereinafter, the structure of each of the projections 41 will be described with reference to FIG. 5. Specifically, a hypothetical plane P2 extends on the bottoms 45a of the second holes 45. As shown in FIG. 5, each of the projections 41 is assumed to be formed on the hypothetical plane P2 and referred to as a hypothetical projection 41a.

As represented by the shaded zones in FIG. 2, some of the hypothetical projections 41a are formed along the first edge 31a and from the rear end to the front end of the first edge section 31. The rest of the hypothetical projections 41a are formed along the fourth edge 34a and from the left end to the right end of the fourth edge section 34. When cut along planes perpendicular to the extending direction of each hypothetical projection 41a, the hypothetical projection 41a exhibits identical cross-sectional shapes at any position. Hereinafter, the "cross-sectional shape" of the hypothetical projection 41a refers to the cross-sectional shape of the hypothetical projection 41a cut along a plane perpendicular to the extending direction of the hypothetical projection 41a.

As illustrated in FIG. 5, each hypothetical projection 41a has an arcuate portion 42a having an arcuate cross section. The arcuate portion 42a is continuous with the first edge 31a as the end surface of the first edge section 31 or the fourth edge 34a as the end surface of the fourth edge section 34. The hypothetical projection 41a has a flat portion 42b continuous with the arcuate portion 42a. The flat portion 42b has a cross section that extends linearly in the surface direction of the surface 30a. The hypothetical projection 41a also has an inclined portion 42c continuous with the flat portion 42b. The inclined portion 42c is inclined with respect to the flat portion 42b and extends in a manner crossing the hypothetical plane P2. The flat portion 42b is continuous with the inclined portion 42c in a smooth manner. The hypothetical plane P2 is continuous with the inclined portion 42c in a smooth manner.

As represented by the shaded area in FIG. 5, in the front left speaker cover 30, the projections 41 are arranged in the first holes 40 located at the positions overlapping with the hypothetical projections 41a. Each projection 41 has a shape identical to the shape of the section of the hypothetical projection 41a located at the position overlapping with the interior of the associated first hole 40. Also, in the front left speaker cover 30, the projections 41 are disposed in the third holes 46 located at the positions overlapping with the hypothetical projections 41a. Each projection 41 has a shape identical to the shape of the section of the hypothetical projection 41a located at the position overlapping with the interior of the associated third hole 46.

That is, as viewed perpendicularly to the surface 30a, the projections 41 in those of the first holes 40 having equal distances from the centers of the first holes 40 to the first edge 31a or the fourth edge 34a have identical shapes. However, as viewed perpendicularly to the surface 30a, the projections 41 in those of the first holes 40 having unequal distances from the centers of the first holes 40 to the first edge 31a or the fourth edge 34a have different shapes. The same applies to the third holes 46.

Although the projections 41 may each include the arcuate portion 42a, the flat portion 42b, and the inclined portion 42c, the projections 41 in those of the first holes 40 opening in the surface direction of the surface 30a each have at least the arcuate portion 42a. That is, the bottom 40a of each of these first holes 40 has an arcuate outer section in the surface direction of the front left speaker cover 30.

The height of each hypothetical projection 41a from the hypothetical plane P2 to the flat portion 42b and the radius of the arcuate portion 42a are determined in correspondence with the diameter of each hole 36. For example, if the diameter of each hole 36 is 1.6 mm, the height of the hypothetical projection 41a from the hypothetical plane P2 to the flat portion 42b is 1.0 mm and the radius of the arcuate portion 42a is 1.5 mm. However, such height and radius are not restricted to these values. Also, the height of each hypothetical projection 41a from the hypothetical plane P2 to the flat portion 42b and the radius of the arcuate portion 42a are determined in correspondence with the angle at which the sight line S of the occupant seated in the driver's seat 11 or the front passenger seat 12 crosses the hypothetical plane P2.

In the front left speaker cover 30, the second holes 45 are arranged at the positions that do not overlap with the hypothetical projections 41a. As has been described, the bottoms 45a of the second holes 45 lack the projections 41. Therefore, the distance L1 from the surface 30a of the front left speaker cover 30 to the bottom 40a of each first hole 40 is shorter than the distance L2 from the surface 30a to the bottom 45a of each second hole 45. The distance L1 is the distance from the surface 30a of the front left speaker cover 30 to the section of the bottom 40a of the first hole 40 that is closest to the surface 30a. The distance L2 is the distance from the surface 30a of the front left speaker cover 30 to the section of the bottom 45a of the second hole 45 that is closest to the surface 30a.

An operation of the speaker covers 30 and 35 will now be described.

In the present embodiment, the speaker covers 30 and 35 have the same operations and advantages even when switched between the left and right sides. Therefore, the detailed description below is focused on the operation and advantage of the front left speaker cover 30, with the description of the front right speaker cover 35 omitted or simplified.

Figure 6:
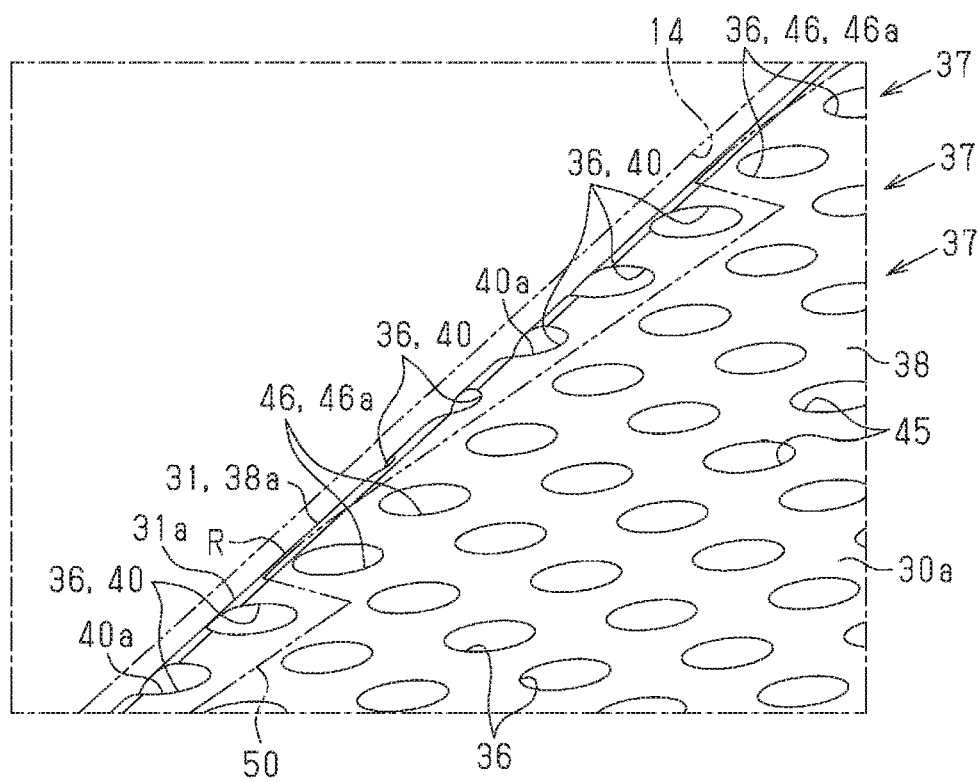
FIG. 6 is an enlarged perspective view showing a front left speaker cover without a projection.

Referring to FIG. 6, a speaker cover lacking the projections 41, unlike the front left speaker cover 30, will be described. In this case, the first holes 40 are formed in the first edge section 31 and the fourth edge section 34. The first holes 40 cause the first edge section 31 to be visually recognized as a non-linear section by the occupant seated in the driver's seat 11 or the front passenger seat 12. That is, those of the first holes 40 opening in the surface direction of the surface 30a form actual dents in the first edge section 31 or the fourth edge section 34. Objects in the vicinity of the speaker cover are thus visible to the occupant through the dents. As a result, the first edge section 31 and the fourth edge section 34 are visually recognized as non-linear sections.

Specifically, some of the holes 36 may also open in the surface direction of the surface 30a in the third edge section 33. However, in this case, the speaker cover is the only component that is visible to the occupant seated in the driver's seat 11 or the front passenger seat 12 through the opening holes 36. Therefore, although some of the holes 36 open in the surface direction of the surface 30a in the third edge section 33, it is unlikely that the third edge section 33 will be visually recognized as a non-linear section.

The holes 36 are arranged in the uniform arrangement pattern with reference to the second edge 32a. As a result, in the first edge section 31 and the fourth edge section 34, the opening degrees of the holes 36 opening in the surface direction of the surface 30a are varied at uniform cycles in the extending directions of the first and fourth edge sections 31 and 34. This may cause the first edge section 31 and the fourth edge section 34 to be visually recognized each as a zigzag-shaped section, that is, a non-linear edge section 50, as represented by the long dashed double-short dashed lines in FIG. 6.

The front left speaker cover 30 of the present embodiment, however, includes the projections 41 in the first holes 40, as shown in FIG. 5. The distance L1 from the surface 30a to the bottom 40a of each first hole 40 is thus shorter than the distance L2 from the surface 30a to the bottom 45a of each second hole 45. The projections 41 are located along the sight line S when the occupant seated in the driver's seat 11 or the front passenger seat 12 views the first edge section 31 and the fourth edge section 34. This decreases the visually recognized depths of the dents in the first edge section 31 and the fourth edge section 34. The first edge section 31 and the fourth edge section 34 are thus unlikely to be visually recognized as non-linear sections, with reference to FIG. 4. That is, despite the fact that the first edge section 31 and the fourth edge section 34 have the first holes 40, the first edge section 31 and the fourth edge section 34 are each visually recognized as a linear or substantially linear section.

The above-described speaker cover 30 has the following advantages. The front right speaker cover 35 also has the same advantages as the front left speaker cover 30.

(1) Among those of the holes 36 having the bottoms, the first holes 40 are shallower than the second hole 45. This decreases visibility of the dents in the first edge section 31 in the sections having the first holes 40. The aesthetic appearance is thus unlikely to deteriorate.

(2) The first holes 40 in the fourth edge section 34 also have the projections 41. This decreases visibility of the dents in the fourth edge section 34, as in the case of the first holes 40 in the first edge section 31.

(3) The bottoms 40a of the first holes 40 in the first edge section 31 are shallower than the bottoms 45a of the second holes 45. In addition, the bottom 40a of each first hole 40 has an arcuate outer section in the surface direction of the front left speaker cover 30. Such arcuate sections of the bottoms 40a of the first holes 40 cause the first edge section 31 to be visually recognized as a linear section. The aesthetic appearance is thus unlikely to deteriorate. Since the same configuration as the above-described configuration is employed in the fourth edge section 34, the fourth edge section 34 has the same advantage as the advantage of the first edge section 31.

(4) The first edge section 31 and the fourth edge section 34 are the edge sections of the first hole forming portion 38 located opposite to the driver's seat 11. Among the edge sections of the front left speaker cover 30, the first edge section 31 and the fourth edge section 34 thus face in the direction away from the occupant seated in the driver's seat 11. That is, the first edge section 31 and the fourth edge section 34 face in the direction away from the center of the passenger compartment 10a. Such arrangement increases visibility of the edge sections 31, 34 in the surface direction of the front left speaker cover 30, compared to the edge sections 32, 33 close to the driver's seat 11, when the occupant seated in the driver's seat 11 views the edge sections 31, 34 of the front left speaker cover 30. This increases visibility of the dents in the edge sections 31, 34 corresponding to the first holes 40. In the present embodiment, however, the first holes 40 are those of the holes 36 having the bottoms and are shallower than the second holes 45. As has been described, this decreases visibility of the dents in the edge sections 31, 34 of the front left speaker cover 30.

(5) In the front left speaker cover 30, the holes 36 are aligned in the uniform arrangement pattern from the second edge 32a as the edge section of the front left speaker cover 30 close to the driver's seat 11. Such arrangement improves the aesthetic appearance of the second edge section 32 as viewed from the driver's seat 11. Also, in the front right speaker cover 35, the holes 36 are arranged in the uniform arrangement pattern from the second edge 32a, which is close to the front passenger seat 12. This improves the aesthetic appearance of the second edge section 32 as viewed from the front passenger seat 12.

(6) The projections 41 reinforce the corresponding edge sections 31, 34. This improves the strength of the front left speaker cover 30.

The above-described embodiment may be modified as follows.

Any number of the holes 36 in the first edge section 31 or the fourth edge section 34 may be the first holes 40, which open in the surface direction. That is, neither one of the speaker covers 30, 35 necessarily has to include the third holes 46. Also, each speaker cover 30, 35 may include a single first hole 40 or multiple first holes 40 opening in the surface direction.

In the first edge section 31 or the fourth edge section 34, not all of the holes 36 opening in the surface direction have to be the first holes 40. That is, some of the holes 36 may open in the surface direction but lack the projections 41 on the bottoms (in the interiors) of the holes 36.

Any number of the third holes 46 may include the projections 41. Alternatively, all of the third holes 46 may lack the projections 41.

The speaker covers 30, 35 do not necessarily have to be configured symmetrically with respect to the hypothetical plane P1. For example, the speaker covers 30, 35 may have different outlines. Also, one of the speaker covers 30, 35 may lack the projections 41.

Only one of the first edge section 31 and the fourth edge section 34 may have the projections 41 on the bottoms of the corresponding holes 36. Alternatively, a single one or multiple ones of the edge sections 31 to 34, as selected as needed, may have the projections 41 on the bottoms of the corresponding holes 36. However, to improve the aesthetic appearance, it is preferable to employ the configuration of the above-described embodiment.

The shape of each speaker cover 30, 35, as viewed perpendicularly to the surface 30a, may be a trapezoidal, square, circular, or elliptical shape. Any number of the edge sections 31 to 34 of the speaker cover 30, 35 may include projecting portions projecting in the surface direction of the surface 30a.

Each speaker cover 30, 35 may include a projecting portion and/or a dented portion in the direction perpendicular to the surface 30a. That is, the surface 30a of the speaker cover 30, 35 is not restricted to a fully flat surface.

The holes 36 may be arranged concentrically or randomly. Any suitable arrangement pattern of the holes 36 may be employed.

The holes 36 may be arranged in the uniform arrangement pattern with reference to any one of the edges 31a to 34a. Alternatively, such arrangement may be performed without referring to any of the edges 31a to 34a.

Each of the holes 36 may be formed in any suitable shape, such as a round shape or a hexagonal shape.

Not all the holes 36 have to have the same shape. For example, multiple types of holes 36, such as circular and elliptical holes 36, may be employed.

Any number of the holes 36 may extend in a direction crossing the surface 30a or be curved, without being restricted to extending in the direction perpendicular to the surface 30a.

As long as the first hole forming portion 38 is adjacent to the second hole forming portion 39, the first hole forming portion 38 does not necessarily have to surround the second hole forming portion 39.

If each speaker cover 30, 35 is capable of transmitting a sufficient volume of sound, the speaker cover 30, 35 may lack the second hole forming portion 39. That is, the speaker cover 30, 35 may lack those of the holes 36 extending through the speaker cover 30, 35 in the thickness direction.

The speaker device may include multiple speaker covers for each speaker. In this case, any number of the speaker covers may include the projections 41 on the bottoms 40a of the first holes 40.

The vehicle 10 is not restricted to including the two speaker devices 25a, 26a and may include a single or three or more speaker devices. Also, any number of the speaker covers may be configured in the same manner as the above-described front left speaker cover 30, in correspondence with the relationship between the mounting positions and the occupant's sight line.

Although each of the sections at which the edges 31a to 34a are continuous with the surface 30a, as a whole, is the arcuate surface R in the embodiment, each of such sections may be a surface including a corner and lack the arcuate surface R.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A cover member for an in-vehicle speaker, comprising:
  a hole forming portion overlapping an edge section of the cover member wherein the hole forming portion includes a plurality of holes each having a bottom, wherein
  the edge section of the cover member includes an edge of the cover member that faces outward along a surface direction of cover member,
  the holes include
    a first hole that is formed in the edge of the cover member and opens in the surface direction of the cover member;
    a second hole that is formed in a section of the cover member different from the edge, and wherein a distance from a surface of the cover member to a bottom of the first hole is shorter than the distance from the surface of the cover member to a bottom of the second hole,
  wherein a projection that protrudes in a normal direction of the cover member is formed on the bottom of the first hole that opens in the surface direction of the cover member.

2. The cover member according to claim 1, wherein an outer section of the bottom of the first hole in the surface direction of the cover member has an arcuate shape.

3. The cover member according to claim 1, wherein, in a state in which the cover member is arranged in an instrument panel of a vehicle, the first hole is formed in the edge of the cover member that also faces in a direction away from a center of a passenger compartment.

4. The cover member according to claim 1, wherein
  the edge section of the cover member includes a first edge section and a second edge section, wherein the second edge section is an opposite edge section to the first edge section,
  the holes are arranged in lines along the second edge section and thus form rows, and
  the rows of the holes are spaced apart at uniform intervals from the second edge section to the first edge section.

5. The cover member according to claim 1, comprising:
  a first hole forming portion serving as the hole forming portion; and a second hole forming portion that is different from the first hole forming portion and has a plurality of holes, wherein each of the holes in the second hole forming portion is either a hole deeper than the holes in the first hole forming portion or a hole extending through the second hole forming portion, and a peripheral edge section of the second hole forming portion is partly or entirely adjacent to the first hole forming portion.

6. The cover member according to claim 1, wherein, the edge of the cover containing the first hole is a first outer peripheral edge;

a second outer peripheral edge is provided which contains no holes opening in the surface direction of the cover member;

the first outer peripheral edge is located opposite the second outer peripheral edge; and the first outer peripheral edge is parallel to the second outer peripheral edge.

7. The cover member according to claim 1, wherein, the edge of the cover containing the first hole is a first outer peripheral edge of the cover member;

a second outer peripheral edge is provided which contains no holes opening in the surface direction of the cover member;

a third hole that is formed in a third outer peripheral edge of the cover member and opens in the surface direction of the cover member;

the edge of the cover containing the first hole is a first outer peripheral edge of the cover member;

the first outer peripheral edge is located opposite the second outer peripheral edge;

the first outer peripheral edge is parallel to the second outer peripheral edge; and the third outer peripheral edge connects the first outer peripheral edge and the second outer peripheral edge.

8. A vehicle comprising:

an instrument panel provided in front of a driver's seat;

an in-vehicle speaker provided on a backside of the instrument panel; and a cover member for the in-vehicle speaker, wherein the cover member includes a hole forming portion in which a plurality of holes each having a bottom is formed, the hole forming portion is a section including an edge of the cover member that faces outward along a surface direction of cover member, the holes include
   a first hole that is formed in the edge of the cover member and opens in a surface direction of the cover member, and
   a second hole that is formed in a section of the cover member different from the edge, and a distance from a surface of the cover member to a bottom of the first hole is shorter than the distance from the surface of the cover member to a bottom of the second hole, and the first hole is formed in the edge of the cover member that also faces in a direction away from a center of a passenger compartment, wherein a projection that protrudes in a normal direction of the cover member is formed on the bottom of the first hole that opens in the surface direction of the cover member.

9. The cover member according to claim 8, wherein, the edge of the cover containing the first hole is a first outer peripheral edge;

a second outer peripheral edge is provided which contains no holes opening in the surface direction of the cover member;

the first outer peripheral edge is located opposite the second outer peripheral edge; and the first outer peripheral edge is parallel to the second outer peripheral edge.

10. The cover member according to claim 8, wherein, the edge of the cover containing the first hole is a first outer peripheral edge of the cover member;

a second outer peripheral edge is provided which contains no holes opening in the surface direction of the cover member;

a third hole that is formed in a third outer peripheral edge of the cover member and opens in the surface direction of the cover member;

the edge of the cover containing the first hole is a first outer peripheral edge of the cover member;

the first outer peripheral edge is located opposite the second outer peripheral edge;

the first outer peripheral edge is parallel to the second outer peripheral edge; and the third outer peripheral edge connects the first outer peripheral edge and the second outer peripheral edge.

11. An in-vehicle speaker device, comprising;

an in-vehicle speaker; and a cover member for the in-vehicle speaker, wherein the cover member includes a hole forming portion in which a plurality of holes each having a bottom is formed, the hole forming portion is a section including an edge of the cover member that faces outward along a surface direction of cover member, the holes include
   a first hole that is formed in the edge of the cover member and opens in a surface direction of the cover member, and
   a second hole that is formed in a section of the cover member different from the edge, and a distance from a surface of the cover member to a bottom of the first hole is shorter than the distance from the surface of the cover member to a bottom of the second hole, wherein a projection that protrudes in a normal direction of the cover member is formed on the bottom of the first hole that opens in the surface direction of the cover member.

12. The cover member according to claim 11, wherein, the edge of the cover containing the first hole is a first outer peripheral edge;

a second outer peripheral edge is provided which contains no holes opening in the surface direction of the cover member;

the first outer peripheral edge is located opposite the second outer peripheral edge; and the first outer peripheral edge is parallel to the second outer peripheral edge.

13. The cover member according to claim 11, wherein, the edge of the cover containing the first hole is a first outer peripheral edge of the cover member;

a second outer peripheral edge is provided which contains no holes opening in the surface direction of the cover member;

a third hole that is formed in a third outer peripheral edge of the cover member and opens in the surface direction of the cover member;

the edge of the cover containing the first hole is a first outer peripheral edge of the cover member;

the first outer peripheral edge is located opposite the second outer peripheral edge;

the first outer peripheral edge is parallel to the second outer peripheral edge; and the third outer peripheral edge connects the first outer peripheral edge and the second outer peripheral edge.

14. A cover structure for an in-vehicle speaker, comprising a cover member for covering the in-vehicle speaker, wherein the cover member includes a hole forming portion in which a plurality of holes each having a bottom is formed, the hole forming portion is a section including an edge of the cover member that faces outward along a surface direction of cover member, the holes include a first hole that is formed in the edge of the cover member and opens in a surface direction of the cover member, and a second hole that is formed in a section of the cover member different from the edge, and a distance from a surface of the cover member to a bottom of the first hole is shorter than the distance from the surface of the cover member to a bottom of the second hole, wherein a projection that protrudes in a normal direction of the cover member is formed on the bottom of the first hole that opens in the surface direction of the cover member.

15. The cover member according to claim 14, wherein, the edge of the cover containing the first hole is a first outer peripheral edge;

a second outer peripheral edge is provided which contains no holes opening in the surface direction of the cover member;

the first outer peripheral edge is located opposite the second outer peripheral edge; and the first outer peripheral edge is parallel to the second outer peripheral edge.

16. The cover member according to claim 14, wherein, the edge of the cover containing the first hole is a first outer peripheral edge of the cover member;

a second outer peripheral edge is provided which contains no holes opening in the surface direction of the cover member;

a third hole that is formed in a third outer peripheral edge of the cover member and opens in the surface direction of the cover member;

the edge of the cover containing the first hole is a first outer peripheral edge of the cover member;

the first outer peripheral edge is located opposite the second outer peripheral edge;

the first outer peripheral edge is parallel to the second outer peripheral edge; and the third outer peripheral edge connects the first outer peripheral edge and the second outer peripheral edge.

\* \* \* \* \*